E. H. ALLEN.
LINEAR METER.
APPLICATION FILED NOV. 8, 1909.
967,297.
Patented Aug. 16, 1910.
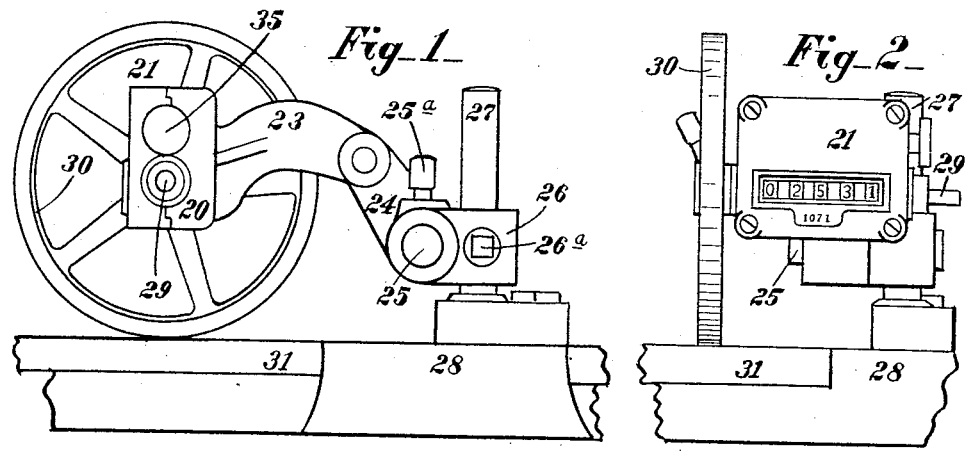
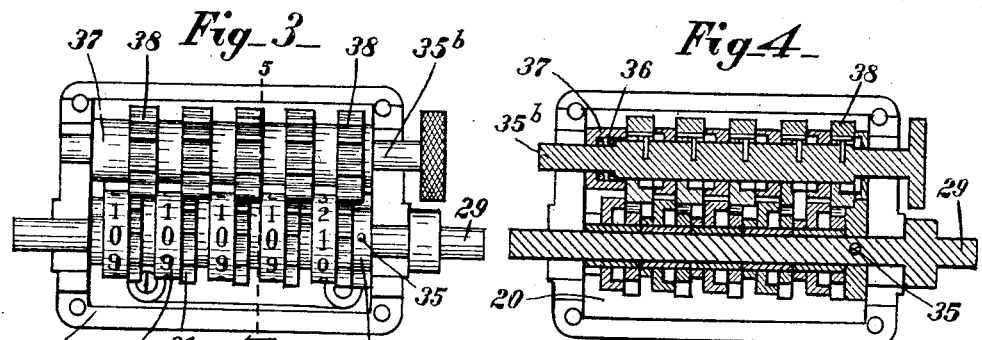
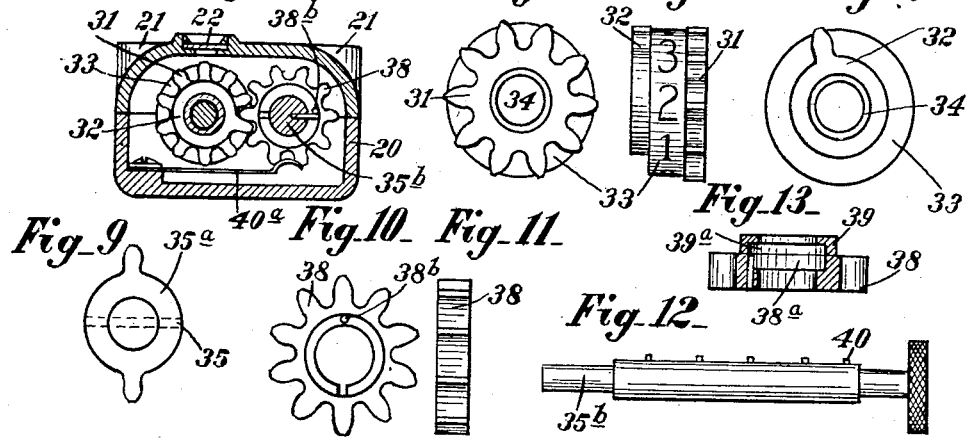
WITNESSES:
Frank C. Palmer
Madeline D. Ritchie
Edgar H. Allen, INVENTOR,
BY Frank H. Allen
ATTORNEY.

UNITED STATES PATENT OFFICE.

EDGAR H. ALLEN, OF NORWICH, CONNECTICUT.

LINEAR METER.

967,297.  Specification of Letters Patent.  Patented Aug. 16, 1910.

Application filed November 8, 1909. Serial No. 526,756.

*To all whom it may concern:*

Be it known that I, EDGAR H. ALLEN, a citizen of the United States, residing at Norwich, in the county of New London and State of Connecticut, have invented certain new and useful Improvements in Linear Meters, of which the following is a specification.

This invention has particular relation to linear meters of the class used for measuring boards and it includes improved means for mounting and adjusting such meters, as well as convenient means for setting the visible register back to zero.

My improved meter is especially valuable for use with planing machinery and is designed to automatically measure and register the running or linear feet as the boards are fed through the said planing machines.

My newly improved meter is illustrated in the annexed drawings, Figures 1 and 2 being, respectively, side and end elevations of a meter of my improved construction. Fig. 3 is a relatively enlarged view of the meter proper, with the cover removed for the purpose of disclosing the interior construction. Fig. 4 is a similar view showing the operative parts in central, longitudinal, section. Fig. 5 is a transverse, sectional, view taken on the line 5—5 of the Fig. 3. In Figs. 6, 7 and 8 I have shown, detached, side and end views of one indicator unit, consisting of a complete gear, a numbered wheel and a mutilated gear. Fig. 9 is a detached, end, view of a mutilated gear which is secured to the driven shaft of the meter and serves as the initial gear of the register train. Figs. 10 and 11 are, respectively, front and side views of one of the gears by means of which I am able to set the register back to zero, and in Fig. 12 I have illustrated the shaft upon which the said re-setting gears are mounted. In Fig. 13 I have shown, in central section, one of the said resetting gears and the coöperating washer that separates the said gear from the next adjoining gear.

Referring now to the drawings, the numeral 20 indicates the main, or body, portion of the meter case and 21 indicates the cover portion; the said cover being provided with an opening 22 through which the register may be seen. The meter is mounted at the otherwise free end of an arm 23 that is hinged to one end of an arm 24, the other end of arm 24 being mounted upon a rod 25 which, in turn, is mounted in a frame 26 that is adjustably mounted upon a vertical post 27. The arm 24 is held in place on the rod 25 by a set-screw 25ª, the frame 26 is clamped in position on the post 27 by means of a set-screw 26ª, and the post 27 is fixedly secured to a bed-plate 28, which may be the bed-plate of a planing machine.

The main, or driven, shaft of the meter is denoted by the reference numeral 29 and said shaft has secured to one end a wheel 30 which rests upon a board 31, when the device is in operation, and thus supports the meter; the hinged connection between arm 23 and arm 24 permitting the wheel 30 to rise and fall to compensate for any inequalities in the thickness of the boards, as the latter pass underneath the wheel. When it is desired to measure boards or joists of materially greater, or lesser, thicknesses the frame 26 may be readily raised or lowered, and the arm 24 may be adjusted to a suitable pitch, in order that the face of the meter may be maintained in an approximately vertical position so that the register may be conveniently seen and read.

Upon that portion of shaft 29 that is within the meter case are loosely mounted several indicator units (five as here illustrated) each unit including a spur gear 31, a single-tooth gear 32 and a numeral wheel 33; said gears being located at the opposite sides of the numeral wheel and fixedly clamped to said wheel by means of a bushing 34 that is spun outward, slightly, at its ends. Secured to shaft 29, by means of a pin 35, is a gear 35ª formed with two oppositely disposed teeth, as will be best understood by reference to Fig. 9 of the drawings. Adjacent to, and parallel with, the shaft 29 is a non-revolving shaft 35ᵇ that may have a limited endwise movement and which is normally prevented from such endwise movement by a spring 36 that abuts a shoulder on said shaft; said spring being housed in a thimble 37. Mounted on shaft 35ᵇ, so as to rotate freely under ordinary conditions, are gears 38 that are approximately equal in thickness to the united thickness of one of the single-tooth gears 32 and the spur gear 31 of the next adjoining unit; the loose gear 38 acting as an intermediate to transmit motion from the said single-tooth gear to the said spur gear and thus cause the spur gear to move a distance equal to one tooth at each complete revolution of the single-tooth gear.

When the register is in use, and the shaft 29 is in revolution, the fixed mutilated gear 35ª engages the first intermediate 38 twice during each revolution of said shaft and thus causes the first numbered wheel to be moved forward a distance equal to two teeth and two numerals. The friction wheel 30, by preference, measures two feet around its circumference so that at each revolution of said wheel the first numeral wheel is moved forward two numbers, thus indicating and registering that two linear feet have been measured. Upon each complete revolution of the first indicator unit the next unit of the train is moved forward one numeral, and so on throughout the entire train.

I will now describe the novel means which I have provided for setting the register back to zero. I have already stated that the shaft 35ᵇ is capable of being moved endwise a limited distance and that the intermediate gears 38 revolve freely on said shaft under ordinary conditions. The said intermediate gears are separated by washers 39 that are cupped as at 39ª, and each of the said gears is similarly cupped, as at 38ª. The shaft 35ᵇ is provided with pins 40 (one for each intermediate gear), which pins lie normally within the unobstructed chamber 39ª of the washer 39. Within the chamber 38ª of the intermediate is a pin or stud 38ᵇ. When it is desired to set the numerals of the register back to zero the shaft 35ᵇ is first pushed inward (against the force of the spring 36) a distance sufficient to move the pins 40 from the chambers 39ª of the washers to the chambers 38ª of the intermediate gears and so that, when the shaft 35ᵇ is rotated, the studs 40 will engage the pins 38ᵇ and thus cause the intermediate gears to rotate with the said shaft; the relative locations of the pins 38ᵇ being such that when the pins of the several intermediate gears have been picked up and moved into alinement with each other, the numeral wheels 33 will have been so adjusted as to bring the several zero marks into alinement. The shaft 35ᵇ may then be released, and the spring 36 will immediately move it endwise into its inoperative position. In order to prevent the accidental disarrangement of the intermediate gears I have provided springs 40ª whose free end portions engage frictionally the teeth of said gears, as will be understood by reference to Fig. 5 of the drawings. For greater convenience in assembling the intermediate gears, washers 39, and shaft 35ᵇ, I provide "key-seats" in said gears and washers so that they may be readily slipped onto the said shaft.

It will be obvious that the register which is here shown and described may be used as a counter and indicator in any case in which continuous or intermittent rotation can be given to the shaft 29, but the said device is particularly useful as a linear meter, as I have stated above, and I have therefore illustrated it as so applied.

Having thus described my invention I claim as new and wish to secure by Letters Patent:—

In a register, the combination with a casing, of a revoluble shaft mounted in bearings therein, a plurality of indicator-units loosely mounted on said shaft, a second endwise-movable shaft also mounted in bearings in said casing and carrying gears operatively associated with said indicator-units, each of said gears being chambered and carrying within said chamber a stud, washers also carried by said second shaft, each washer being disposed between two of said gears and being chambered, said second shaft also carrying, toward one end, a thimble bearing against the inner surface of one wall of the casing, said second shaft having a shoulder, a spiral spring carried by said second shaft and disposed inside of said thimble and bearing, at one end, against said thimble and, at its other end, against said shoulder, and pins carried by said second shaft, each pin lying normally within the chamber of a washer, but entering the chamber of the adjacent gear, to engage its stud, when said second shaft is moved endwise.

EDGAR H. ALLEN.

Witnesses:
FRANK H. ALLEN,
MADELINE D. RITCHIE.